(12) United States Patent
Wagener et al.

(10) Patent No.: US 8,437,642 B2
(45) Date of Patent: May 7, 2013

(54) SPATIAL LIGHT MODULATOR (SLM)-BASED OPTICAL ATTENUATOR

(75) Inventors: Jefferson L. Wagener, Morristown, NJ (US); Thomas Andrew Strasser, Warren, NJ (US)

(73) Assignee: Nistica, Inc., Bridgewater, NJ (US)

( * ) Notice: Subject to any disclaimer, the term of this patent is extended or adjusted under 35 U.S.C. 154(b) by 994 days.

(21) Appl. No.: 12/192,952

(22) Filed: Aug. 15, 2008

(65) Prior Publication Data

US 2010/0039694 A1 Feb. 18, 2010

(51) Int. Cl.
*H04B 10/00* (2006.01)

(52) U.S. Cl.
USPC ............. 398/158; 398/159; 398/160; 398/81; 398/33; 398/34; 398/37; 398/38; 398/79; 398/119; 398/48; 385/24; 385/37; 385/16; 385/17; 385/18; 359/290; 359/291; 359/292; 359/298

(58) Field of Classification Search ........... 398/79, 398/45, 48, 50, 82, 83, 84, 85, 87, 88.158, 398/147, 159, 33, 34, 38, 81, 119, 160, 177, 398/180, 37; 385/24, 37, 16, 17, 18, 15; 359/279, 290, 298, 297, 300, 302, 276, 291, 359/292, 295
See application file for complete search history.

(56) References Cited

U.S. PATENT DOCUMENTS

| | | | |
|---|---|---|---|
| 5,844,588 A | 12/1998 | Anderson | |
| 6,665,110 B2 * | 12/2003 | Pettitt | ............................ 359/291 |
| 6,934,069 B2 * | 8/2005 | Moon et al. | .................... 359/290 |
| 7,019,883 B2 * | 3/2006 | Moon et al. | .................... 359/290 |
| 7,126,740 B2 * | 10/2006 | Szczepanek et al. | ......... 359/290 |
| 7,145,710 B2 * | 12/2006 | Holmes | ......................... 359/279 |
| 7,257,288 B1 | 8/2007 | Strasser et al. | |
| 2002/0176151 A1 | 11/2002 | Moon et al. | |
| 2003/0086150 A1 | 5/2003 | Moon et al. | |
| 2003/0090756 A1 | 5/2003 | Moon et al. | |
| 2003/0133178 A1 * | 7/2003 | Pettitt | ........................... 359/276 |
| 2003/0231365 A1 | 12/2003 | So | |
| 2004/0096212 A1 | 5/2004 | McLeod et al. | |
| 2004/0120049 A1 | 6/2004 | Bartlett et al. | |
| 2006/0139635 A1 | 6/2006 | Kersey et al. | |
| 2007/0047043 A1 | 3/2007 | Kapellner et al. | |
| 2007/0080893 A1 | 4/2007 | Lee | |

FOREIGN PATENT DOCUMENTS

| | | |
|---|---|---|
| EP | 1400917 A1 | 3/2004 |
| JP | 1995-092519 A | 4/1995 |

* cited by examiner

*Primary Examiner* — Hanh Phan
(74) *Attorney, Agent, or Firm* — Stuart H. Mayer; Mayer & Williams P.C.

(57) ABSTRACT

A method and apparatus are provided for attenuating an optical beam. The method includes selecting a level of attenuation to be applied to the optical beam. A pattern of on-state and off-state pixels in a two dimensional spatial light modulator (SLM) is selected such that the pattern will modulate the optical beam to provide the selected level of attenuation. Finally, the optical beam is directed onto the SLM while tile pixels are arranged in the selected pattern. The pattern is periodic along a first axis and symmetric along a second axis along which an intensity distribution of die optical beam extends.

62 Claims, 7 Drawing Sheets

SPATIAL LIGHT MODULATOR (SLM)-BASED OPTICAL ATTENUATOR

BACKGROUND OF THE INVENTION

Pixel-based Spatial Light Modulators ("SLMs") can be used to modulate an incoming optical signal. A spatial light modulator (SLM) consists of an array of optical elements (pixels) in which each pixel acts independently as an optical "valve" to adjust or modulate light intensity. An SLM does not create its own light, but rather modulates (either reflectively or transmissively) light from a lamp or other light source to create a dynamically reconfigurable digital image. Technologies that have been used as spatial light modulators include acousto-optic modulators, liquid-crystal devices, and mirror arrays such as digital micromirror devices (DMDs) and grating light valve (GLV) devices.

SLMs can be used in many contexts, such as in projection displays, printing, telecommunications, direct-write lithography and in other types of optical signal processing. For instance, in a telecommunications context, an optical signal propagating through an optical network can have multiple different channels or carrier wavelengths. SLMs are capable of equalizing, filtering, modulating, and controlling such optical signals.

Various devices in which SLMs are employed include, without limitation, dynamic gain equalizers, optical switches, display devices, attenuators, dynamic diffractive optical elements, beam steering devices, photolithographic laser mask writers and the like. The functionality of these devices are not mutually exclusive. For instance, an SLM-based device that is used as an optical attenuator may also be used to perform optical switching.

There is a need to improve the aforementioned SLM-based devices when they are used to perform attenuation.

SUMMARY OF THE INVENTION

In accordance with the present invention, a method and apparatus are provided for attenuating an optical beam. The method includes selecting a level of attenuation to be applied to the optical beam. A pattern of on-state and off-state pixels in a two dimensional spatial light modulator (SLM) is selected such that the pattern will modulate the optical beam to provide the selected level of attenuation. Finally, the optical beam is directed onto the SLM while the pixels are arranged in the selected pattern. The pattern is periodic along a first axis and symmetric along a second axis along which an intensity distribution of the optical beam extends.

In accordance with another aspect of the invention, the optical beam may have an asymmetric intensity distribution extending along the first axis.

In accordance with another aspect of the invention, the optical beam may be dispersed into a plurality of wavelengths that are distributed along the first axis of the SLM.

In accordance with another aspect of the invention, the plurality of wavelengths may be recombined after being modulated by the SLM to form a recombined optical beam with the selected level of attenuation that can be varied according to wavelength.

In accordance with another aspect of the invention, the periodicity of the selected pattern may be less than a diameter of the optical beam.

In accordance with another aspect of the invention, the periodicity of the selected pattern may be less than about ¼ of a diameter of the optical beam.

In accordance with another aspect of the invention, the periodicity of the selected pattern along the first axis may be less than about $1/10^{th}$ of the diameter of the optical beam.

In accordance with another aspect of the invention, the pattern may have regions that impart substantially the same level of attenuation to portions of the optical beam on either side of any local intensity maximum therein.

In accordance with another aspect of the invention, the pattern may have regions that impart substantially the same level of attenuation to portions of the optical beam where there is a maximum rate of change in intensity on either side of a local intensity maximum.

In accordance with another aspect of the invention, the periodicity of the selected pattern may change over distances larger than a beam diameter of each individual wavelength to thereby impart relatively uniform levels of attenuation that can be selectively changed for different wavelength ranges.

In accordance with another aspect of the invention, the periodicity of the selected pattern may change over distances smaller than a beam diameter of each individual wavelength to thereby impart nominally continuous attenuation level changes for a particular wavelength range.

In accordance with another aspect of the invention, the continuous attenuation level may change within a particular wavelength range of a high bandwidth signal are selected to improve signal integrity of at least one high intensity bandwidth signal within the particular wavelength range.

In accordance with another aspect of the invention, the selected attenuation level may change within the particular wavelength range of a high bandwidth signal yields an attenuation change as a function of wavelength across a highest intensity of the signal that is approximately linear.

In accordance with another aspect of the invention, the selected attenuation level may change within the particular wavelength range of a high bandwidth signal yield an attenuation change as a function of wavelength across a highest intensity bandwidth of the signal that is approximately quadratic.

In accordance with another aspect of the invention, the selected attenuation level may change within the particular wavelength range of a high bandwidth signal to yield an attenuation change across the highest intensity portion of the signal that complements a previous wavelength-dependent attenuation arising in the transmission path to cause an overall wavelength-independent net attenuation of a highest intensity portion of the signal.

In accordance with another aspect of the invention, the selected attenuation level may change within the particular wavelength range of a high bandwidth signal yield an attenuation change as a function of wavelength that reduces the bandwidth of the highest intensity portion of the signal.

In accordance with another aspect of the invention, feedback from a receiving photodetector at an end of a transmission system may be used to select the attenuation level changes within a particular wavelength range of a high bandwidth signal.

In accordance with another aspect of the invention, an optical device is provided that includes an input port for receiving an optical beam and an SLM having a surface for receiving the optical beam. The surface includes an array of pixels such that the optical beam is incident upon a plurality of the pixels, each of the pixels being in one of a multiple of discrete states that provide different amounts of modulation to optical energy incident thereon. The pixels are arranged in a pattern of the states that attenuate the optical beam by a desired amount. The pattern is periodic along a first axis and symmetric along a second axis along which an intensity distribution of the optical beam extends

DETAILED DESCRIPTION

Figure 1:
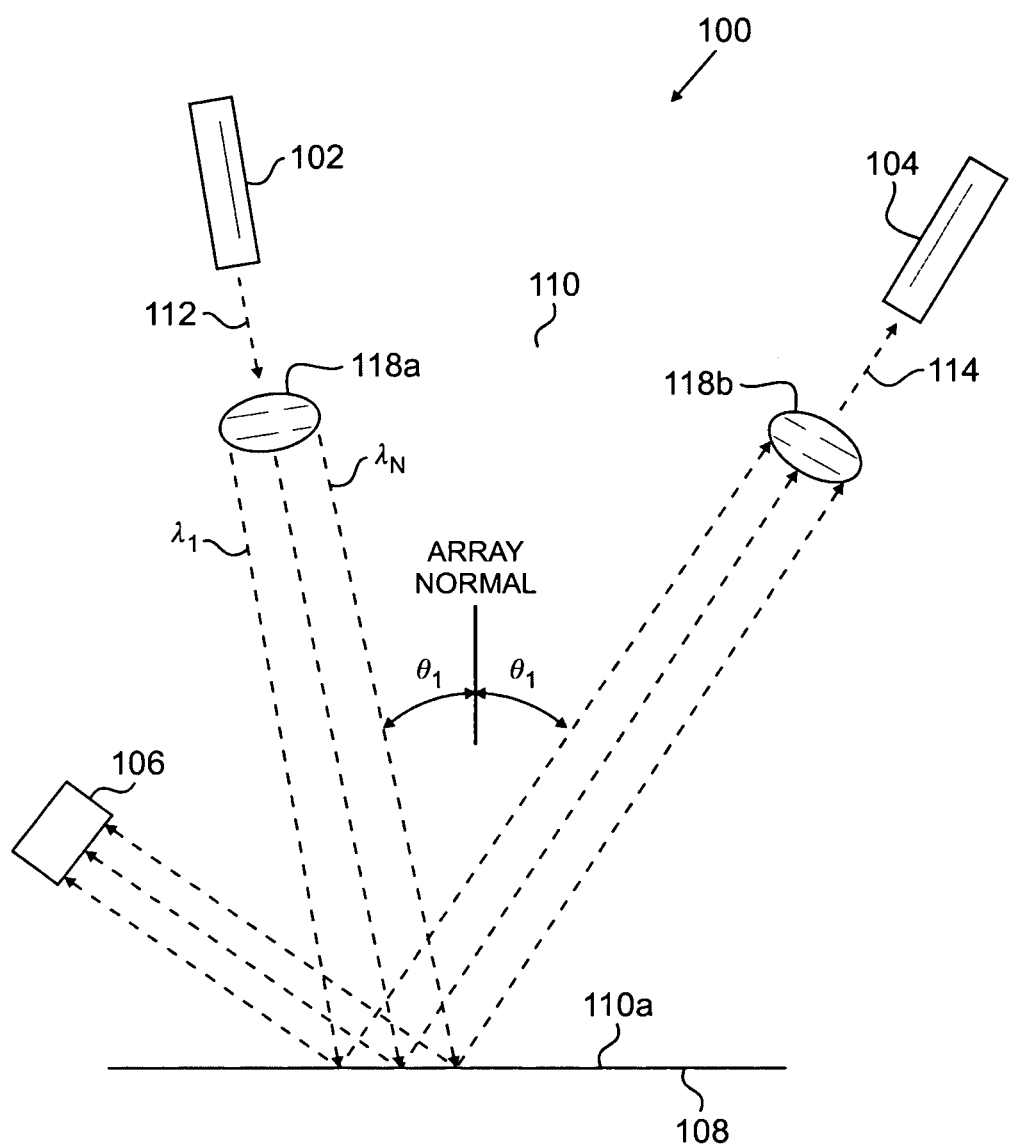
FIG. 1 is a block diagram of one example of an optical device that employs a spatial light modulator (SLM) for attenuating an optical beam or signal.

FIG. 1 is a block diagram of one example of an optical device 100 that employs a spatial light modulator (SLM) for attenuating an optical beam or signal. In this example, optical device 100, which can function as a Variable Optical Attenuator (VOA), includes an input optical fiber 102 capable of introducing a multiple wavelength signal 112 to device 100 and an output optical fiber 104 capable of removing at least a portion of signal 112 from device 100. In various embodiments particularly suitable to the telecommunications industry, a multiple wavelength optical signal 112 may comprise one or more wavelengths within the C-band (wavelengths between about 1525 to 1565 nm) or the L-band (wavelengths between about 1565 to 1625 nm).

Optical device 100 also includes a first dispersive grating arrangement 118a and a second dispersive grating arrangement. In this example, first dispersive grating arrangement 118a operates to separate multiple wavelength signal 112 into discrete wavelengths or channels ($\lambda_1$-$\lambda_n$) and to focus the wavelengths onto tile SLM 108. Similarly, second dispersive grating arrangement 118b operates to combine the reflected wavelengths from SLM 108 into an output multiple wavelength optical signal 114 and to focus signal 114 into output optical fiber 104. First and second dispersive grating arrangements may include a combination of gratings, lens (e.g., collimating lens) as well as other optical elements.

The SLM 108 is operable to spatially modulate the optical wavelengths. The SLM 108 selectively communicates by reflection one or more of the optical wavelengths to the optical output fiber 104 while modulating the incoming wavelengths such that the SLM 108 acts as an optical signal processor. This optical signal processing could be, for example, optical attenuation, wavelength filtering, optical performance monitoring, co-channel modulation, dispersion compensation and the like. In the present example the SLM 108 is used to perform optical attenuation.

One type of micro-mirror based SLM is a digital micromirror device (DMD). A DMD is comprised of a two-dimensional array of micromirrors or pixels, each actuatable in an ON state or an OFF state. As used herein in the context of a DMD, the terms "micromirror" and "pixel" are used interchangeably. Typically, a DMD consists of an array of tiny mirrors (typically, several million per square inch), wherein the angular position of each mirror element is individually controllable between at least two positions that are angularly offset from one another by approximately 10 to 20 degrees, for instance. A mirror base is located behind the mirror elements. The individually addressable mirror elements are tiltably mounted on mechanical hinges, and typically the array of mirror elements overlays a layer of controlling circuitry in the mirror base, all of which is mounted on a semiconductor chip. The mirror face of the DMD is composed of a generally rectangular grid array of rectangular or square mirror elements. A typical mirror element is about 16 micrometers square, and the individual elements are separated from one another by a distance of about 1 micron. Individually controlled tilting of the mirror elements in the array around at least one axis allows energy that is reflected from the mirror face to be formed into a predetermined pattern. Further, the mirror face can be substantially instantaneously reconfigured in response to digital signals to form a different pattern. Such reconfiguration is accurate and reproducible, and can generally be achieved in about 25 microseconds or less.

Figure 2:
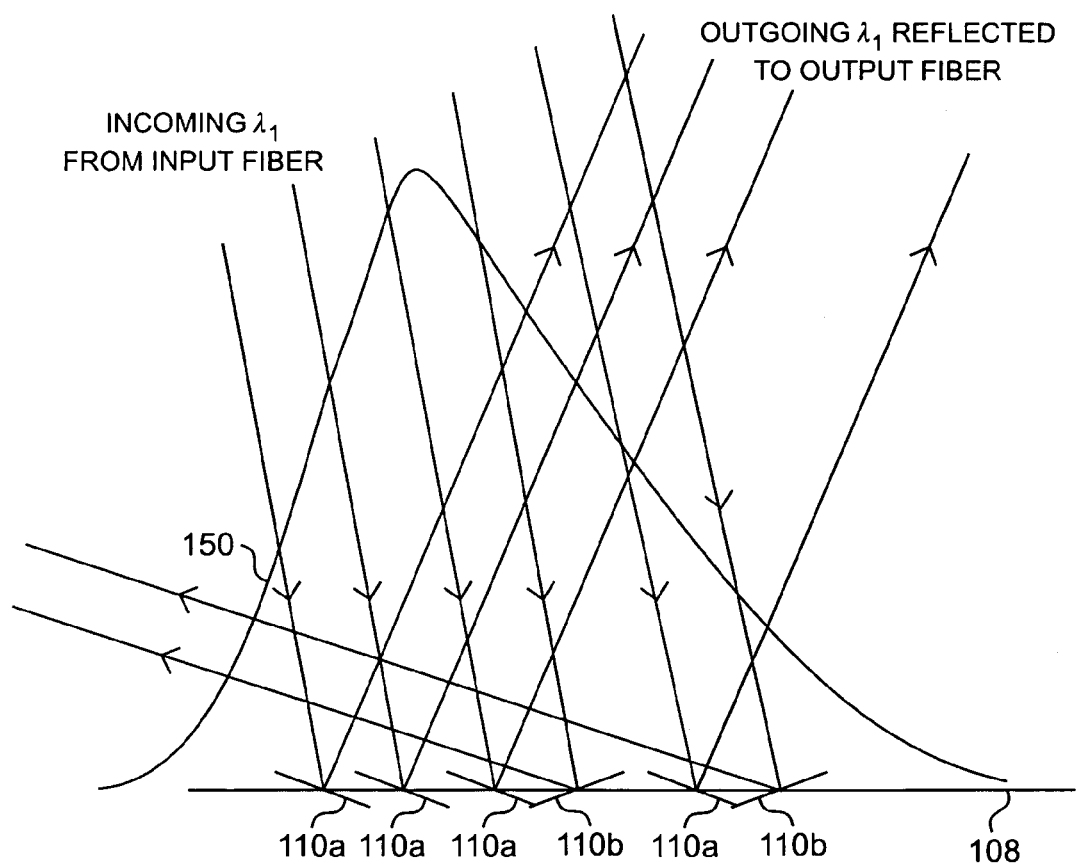
FIG. 2 shows an enlarged, partial cross-sectional view of an on which a wavelength $\lambda_1$ is incident.

In the example of FIG. 1 the SLM 108 is a DMD in which the pixels are formed from a series of micromirrors (not visible in FIG. 1). Typically, each individual wavelength received by SLM 108 is spread over several micromirrors to enable micromirrors 110 to control the amount of light that couples into output fiber 104. This is most clearly seen in FIG. 2, which is an enlarged partial view of SLM 108. For clarity FIG. 2 only shows the micromirrors 110 upon which wavelength $\lambda_1$ is incident. As with any optical beam, the intensity of wavelength $\lambda_1$ is spatially distributed, as indicated by intensity distribution curve 150. The intensity distribution curve is often a Gaussian distribution, as shown, but is not limited thereto. In operation, on-state micromirrors 110a operate to selectively reflect at least some of the energy of wavelength $\lambda_1$ to output fiber 104. In addition, OFF-state micromirrors 110b operate to selectively reflect some of the energy in wavelength $\lambda_1$ away from output fiber 104. In this example the OFF-state micromirrors 110b reflect the energy to drop port 106. In this way the SLM 108 can vary the optical power of wavelength $\lambda_1$ coupled into output fiber 104 by selectively varying the operating state of some of the micromirrors 110. The optical power of wavelengths $\lambda_2$-$\lambda_n$ that is directed to output port 104 by the SLM 108 can be attenuated or otherwise varied in a similar manner.

The structure of the SLM-based optical device shown in FIG. 1 is just one example of an optical system in which the embodiments discussed in this application can be applied. For example, in some applications, it may be desirable to direct the reflected beam back along the same path and use a circulator or other means to separate the incoming and outgoing beam. In other embodiments the SLM 108 may selectively communicate one or more wavelengths to the output fiber 104 by transmission instead of reflection. In yet other embodiments the SLM-based optical device may be a device in which the SLM is used to perform one or more functions in addition to attenuation. As previously mentioned, some examples of such devices include dynamic gain equalizers, optical switches, display devices, attenuators, dynamic diffractive optical elements, beam steering devices and photolithographic laser mask writers. One particular example of an optical switch in which the embodiments discussed in this application can be applied is disclosed in U.S. application Ser.

Nos. 11/781,931 and 11/781,940, which are each hereby incorporated by reference in their entirety.

Figure 3:
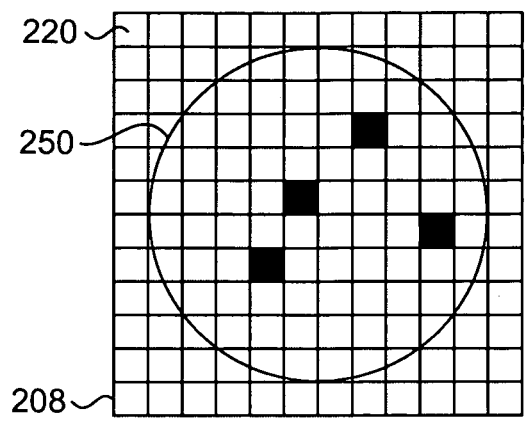
FIG. 3 is a plan view of an SLM of the type employed in the optical device of FIG. 1 illustrating individual pixels in an ON or OFF state.

FIG. 3 is a plan view of an SLM 208 of the type employed in the optical device of FIG. 1 for the purpose of illustrating the individual pixels 220 (only one of which is labeled). A single optical beam 250 is also shown incident on the SLM 108. The spot size of the beam 250 covers a group of pixels and it is the organization of these groups of pixels and their variable patterns that distinguish one application from another. Since the optical beam is distributed in intensity, not every pixel receives the same amount of energy. For instance, if the optical beam has a Gaussian distribution, the intensity will be a maximum on the centermost pixel. If one organizes the area under the spot size into a segment of H (height) rows and W (width) columns of micromirrors, then by decreasing the number of ON-state pixels, the light intensity reflected off of the segment of pixels will be diminished accordingly. Conversely, by continuously increasing the number of ON-state pixels, the intensity of the reflected light will gradually return to it previous level.

Figure 4:
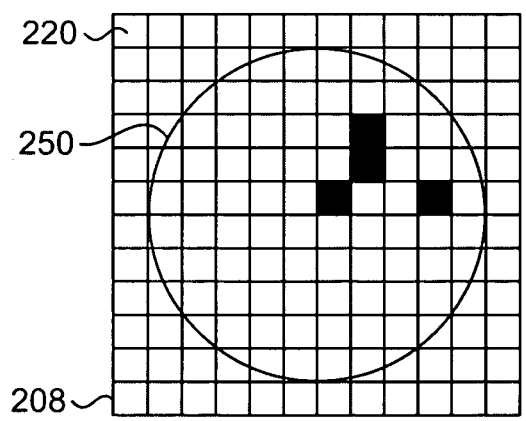
FIGS. 4 and 5 show plan views of the SLM shown in FIG. 3 in which different sets of pixels are in their OFF state yet achieve the same level of attenuation.
Figure 5:
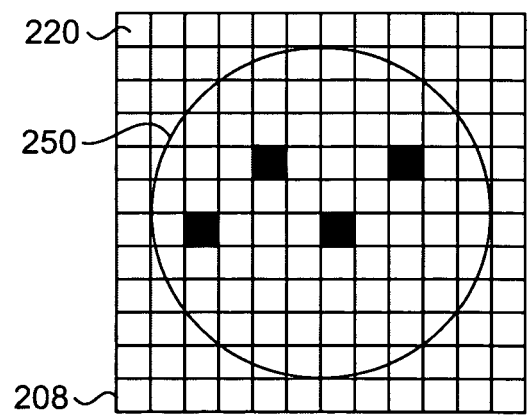

In the interest of clarity of discussion, in FIG. 3 and the figures that follow pixels that are in their OFF state will be shaded and pixels that are in their ON state will be unshaded. As noted above, any given wavelength can be attenuated by decreasing the number of ON state pixels onto which the given wavelength is incident. For instance, in FIG. 3 the optical beam is being attenuated by an amount equivalent to the light incident on 4 pixels. FIG. 4 shows the SLM 208 attenuating the optical beam 250 by the same amount as in FIG. 3. In FIGS. 3 and 4, however, different sets of 4 pixels are in their OFF state. That is, different patterns of the OFF state pixels are used in FIGS. 3 and 4 to achieve the same level of attenuation. FIG. 5 shows yet another pixel pattern that achieves the same level of attenuation as in FIGS. 3 and 4.

Figure 6:
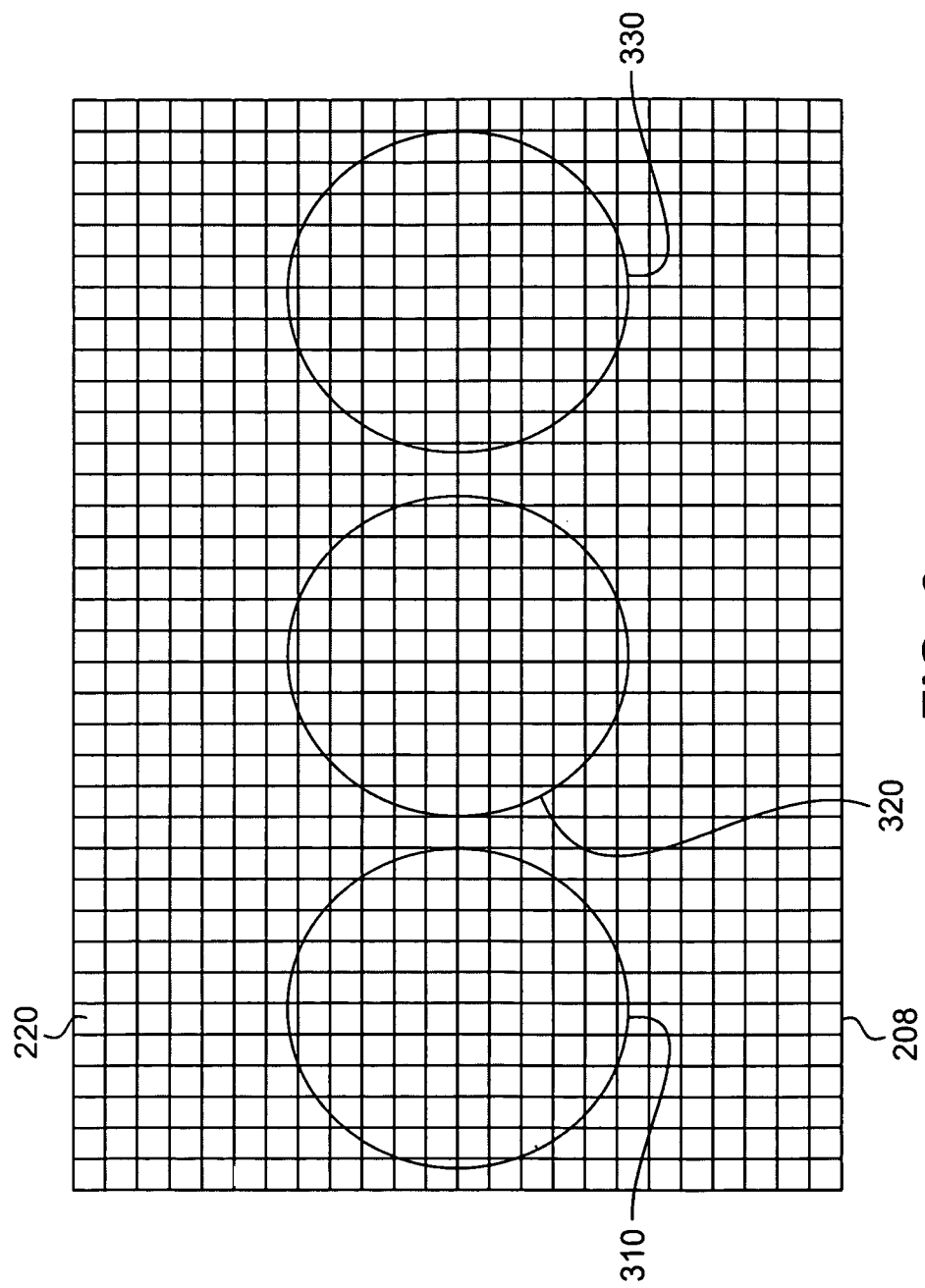
FIG. 6 shows a plan view of the SLM employed in the optical device of FIG. 1 with three spatially separated optical wavelengths focused thereon.
Figure 7:
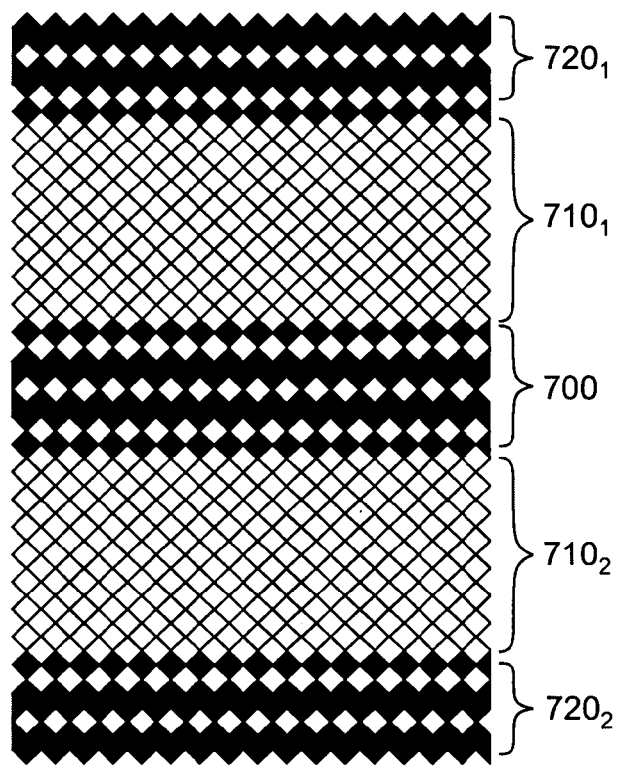
FIGS. 7-10 show examples of pixel patterns that are symmetric with respect to the center of the optical beam in the direction along the beam axis and periodic along the spectral dispersion axis.
Figure 8:
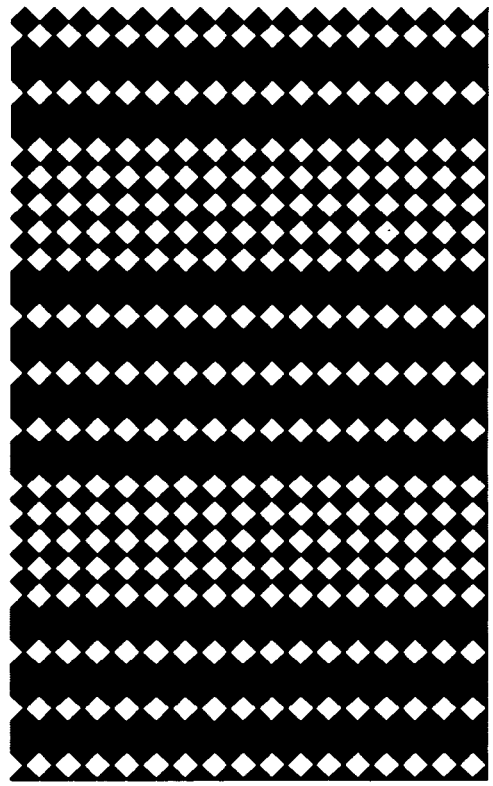
Figure 9:
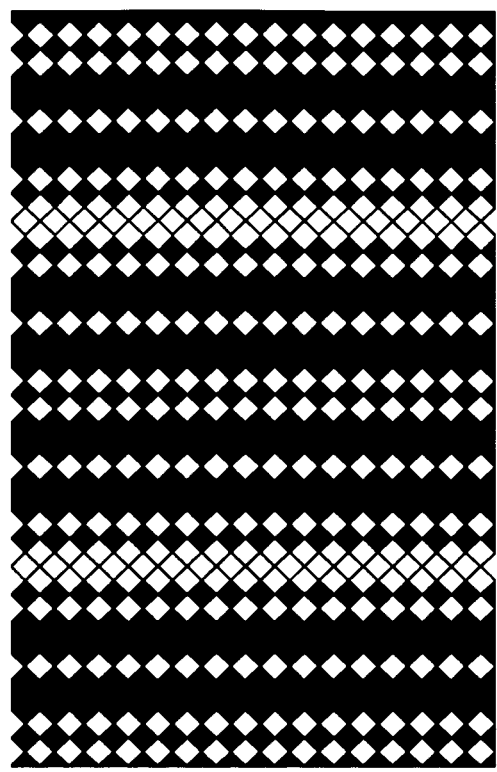
Figure 10:
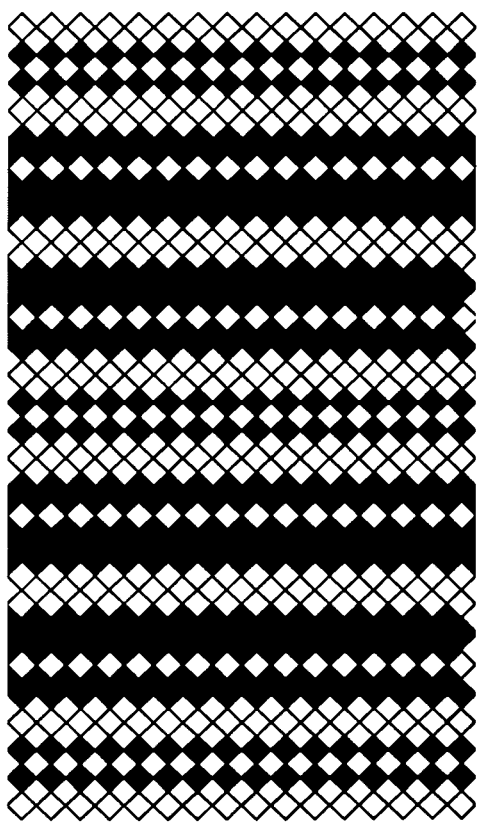

FIG. 6 shows a plan view of the SLM 108 employed in the optical device of FIG. 1 and spatially separated optical wavelengths $\lambda_1$, $\lambda_2$ and $\lambda_3$ (represented by beams 310, 320 and 330, respectively) that are focused onto the SLM 108 by the first dispersive grating arrangement 118a. Although 3 wavelengths are shown for purposes of illustration, more generally any number of wavelengths may be spatially separated across the SLM 108. In this example the spectral dispersion axis of the SLM 108 is assumed to be in the horizontal direction and the orthogonal axis along which individual wavelengths are contained is assumed to be in the vertical direction. This orthogonal axis will be referred to herein as the beam axis. However, other orientations are also possible. In the case of a DMD, the pivoting axes of the micromirrors will generally extend parallel to the spectral dispersion axis. As FIG. 6 shows, the beam diameter for each wavelength in this example extends over about ten pixels.

Although as discussed above different pixel patterns may be used to attenuate the wavelengths $\lambda_1$-$\lambda_3$ by a given amount, some pixel patterns will be more desirable to use than others. When selecting an appropriate pixel pattern to use when attenuating a spatially dispersed optical beam by a given level of attenuation, a number of factors should be taken into consideration. First, the ideal pattern should be relatively insensitive to small fluctuations in the position of the incident light on the SLM. Such fluctuations may arise from a variety of factors including inaccuracies in beam alignment, vibration, temperature variations and the like. Second, in many cases the level of attenuation that is desired should be independent of wavelength. That is, as any of the wavelengths $\lambda_1$-$\lambda_3$ are scanned along the spectral dispersion axis of the SLM 108 the amount of attenuation that the wavelength experiences should be substantially the same.

The first criterion, insensitivity to beam position, can be satisfied by using a pixel pattern that is symmetric with respect to the center of the optical beam in the direction along the beam axis.

The second criterion, wavelength independent attenuation, can be satisfied by using a pixel pattern that is periodic along the spectral dispersion axis. Various examples of pixel patterns satisfying both criteria are shown in FIGS. 7-10. In these figures the pattern is symmetric along the vertical axis and periodic along the horizontal axis. The optical beam generally will be incident upon the center of the pattern. Typically, the periodicity of the pattern should be less than the diameter of the optical beam, and in some cases less than about ¼ of the optical beam diameter.

SLM pixel patterns that meet each of the aforementioned criteria may be generated for each level of attenuation that is desired. For instance, some optical devices are required to provide a variable degree of attenuation in e.g., 0.1 dB increments between 0 and e.g., a 15 dB attenuation level. In this case one or more patterns may be generated for each 0.1 dB increment of attenuation.

A qualitative comparison of the patterns in FIGS. 7-10 illustrates features that the periodic patterns all have in common. All the patterns satisfy the two criteria specified above since they are all periodic in the horizontal axis and symmetric in the vertical axis. In addition, however, as perhaps best seen in FIG. 7, the patterns are arranged into different regions that impart greater and lesser amounts of attenuation. In this example these regions are arranged into 5 different bands or stripes, denoted in FIG. 7 as stripes 700, $710_1$ and $710_2$, and $720_1$ and $720_2$. The Gaussian beam incident on the pattern is aligned over the stripes so that the center (i.e., peak) of the beam is incident on the center stripe 700 and the portions of the beam on either side of center (which is where the Gaussian beam undergoes it maximum spatial change in intensity) are incident on the similar stripes $710_1$ and $710_2$, respectively. Finally, the outermost portions of the Gaussian beam, where the intensity is lowest, are incident on stripes $720_1$ and $720_2$. While clearest in FIG. 7, this same trend is present in all of the patterns shown in FIGS. 7-10. An intuitive explanation for these features exhibited by the patterns is that such patterns are insensitive for a Gaussian beam because, to first order, the two stripes $710_1$ and $710_2$ around the beam's maximum rate of change in intensity offset each other as the beam is incrementally translated from the center position on which it is incident. It can also be seen in FIGS. 7-10 that the five regions have lighter and darker (corresponding to pixel ON-states and OFF-states, respectively) sub-regions that vary absolutely and relative to each other to obtain a fine granularity in the attenuation level while maintaining a relative insensitivity to vertical motion of the Gaussian beam on the SLM. Note that on the orthogonal or horizontal axis insensitivity is achieved via a two column periodicity that is less than about $\frac{1}{10}^{th}$ of the half-width of the Gaussian beam (which in these examples can be deduced to be about 25 pixel rows from the center-center spacing of the two stripes $710_1$ and $710_2$ on either side of the center stripe 700).

An additional consideration to optimize attenuation patterns is the management of those patterns at transitions in attenuation level. This is particularly of concern in wavelength-dependent attenuation applications such as optical switching or dynamic channel equalization. These applications can use a periodic attenuation pattern along the spectral dispersion axis to provide uniform, independently configurable attenuation to optical channels in individual wavelength ranges. This requires a transition between different patterns at the attenuation boundaries between different levels, and attenuation errors can arise if the full periodicity of the attenuation patterns are not present at the boundary. The errors arise because the full period of the pattern is needed to achieve the desired attenuation, and if the number of pattern columns in a defined channel is not evenly divisible by the pattern period, then there can be an attenuation level error that arises from a partial pattern without the desired average attenuation level. The strategy to minimize this error may generally employ at least one of three approaches: (1) choosing patterns with individual rows that closely approximate the target attenuation level, (2) minimizing the number of columns in the application with incomplete periods, or (3) positioning the arrangement (or periodic phase) of a given pattern to minimize the disruption at the attenuation boundary. An example of approach (1) is to use patterns in each column that all have the target attenuation level. An example of approach (2) would be to always start at least one side of a pattern with a full period, and preferably choose the periodicity and attenuation level boundaries so that the entire area has only full periods (including both boundaries). An example of approach (3) would be to change the column ordering or phase of a pattern such that any remaining partial period would have an average attenuation that is close to the target value.

The SLM pixel patterns may be generated when the SLM receives appropriate control signals from a processor. A storage medium associated with the processor may store program instructions that the processor uses to generate the various patterns. Such a processor will execute the instructions, either at the assembly, compiled or machine-level. The instructions can be written by one of ordinary skill in the art following the description provided herein and stored or transmitted on a computer readable medium. The instructions may also be created using source code or any other known computer-aided design tool. A computer readable storage medium may be any medium capable of carrying those instructions and include a CD-ROM, DVD, magnetic or other optical disc, tape, silicon memory (e.g., removable, non-removable, volatile or non-volatile), and/or packetized or non-packetized wireline or wireless transmission signals.

Figure 11:
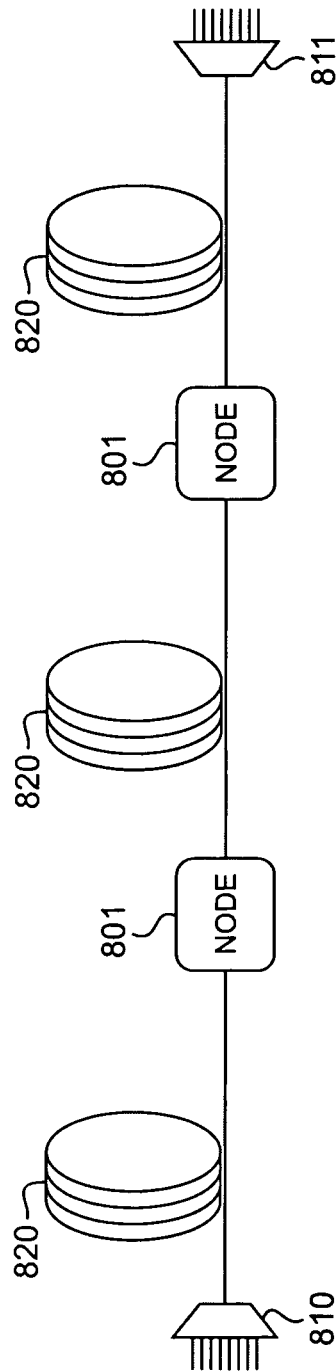
FIG. 11 shows three spans in an illustrative linear communication system.

It is expected that the VOA described herein can perform several important features when employed in a fiber optic communication system. FIG. 11 shows three spans 820 in a illustrative linear communication system. The spans 820 are optically coupled via intermediate nodes 801 and 802. This system provides a means to multiplex multiple different information carrying streams of wavelengths 810 so that they can be transported to a demultiplexer 811. The present invention can be advantageously employed for multiple purposes in the intermediate nodes.

Figure 12:
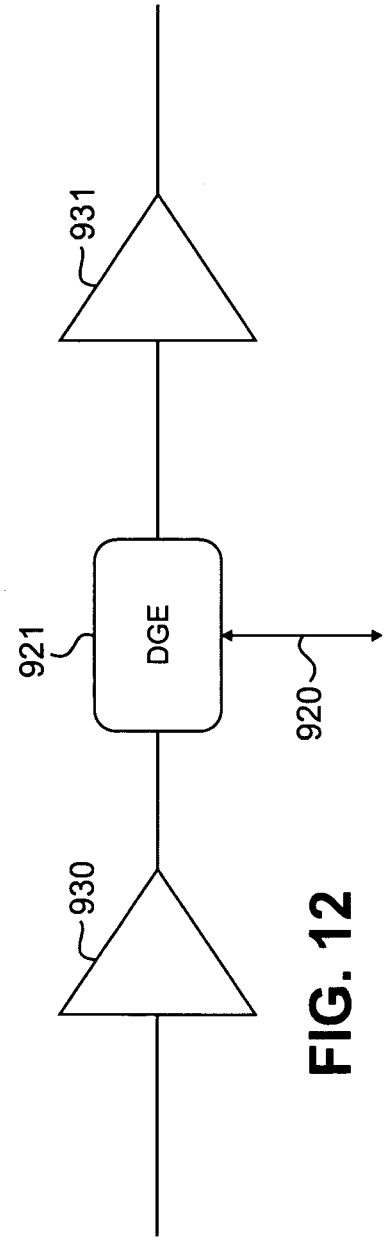
FIG. 12 shows one potential configuration for the intermediate nodes shown in FIG. 12.

One potential configuration for the intermediate nodes is shown in FIG. 12. As shown, the node includes an optical preamplifier 930, an optical processor 921 and an optical post amplifier 931. The two optical amplifiers 930 and 931 compensate for optical loss by providing higher signal powers when optical signals are transmitted along long lengths of optical fiber with optical loss. It will often be beneficial, however, for the optical processor 921 to be able to dynamically control the per channel loss in order to effectively provide optimum per channel output power after the post amplifier 931. This per channel output power control functionality can be referred to as Dynamic Gain Equalization and the optical processor 921 can be referred to as a Dynamic Gain Equalizer (DGE). A DGE is useful for many purposes, including correction for non-optimum gain arising in optical amplifiers. Alternately, the DGE may be used to "preemphasize" channels that require more signal power to improve margin for low margin channels. An alternate or enhanced functionality is to integrate the capability of the DGE to control attenuation with the ability to optionally route channels for local use at each node using, for instance, fiber 920 shown in FIG. 12. A device incorporating this integrated functionality is typically referred to as a Wavelength Selective Switch (WSS), and such a switch can have enhanced functionality and performance when using the techniques demonstrated by the VOA of the present invention. Furthermore, it is to be understood that the functionality of the WSS can be used to make a full non-blocking cross-connect between multiple fibers. This is useful when extending the linear transmission system shown in FIG. 11 to a more complex, interconnected mesh system.

The invention claimed is:

1. A method of attenuating an optical beam, comprising:
   selecting a level of attenuation to be applied to an optical beam;
   selecting a pattern of on-state and off-state pixels in a two dimensional spatial light modulator (SLM) such that the pattern will modulate the optical beam to provide the selected level of attenuation; and
   directing the optical beam onto the SLM while the pixels are arranged in the selected pattern, wherein the pattern is periodic along a first axis and symmetric about a second axis along which an intensity distribution of the optical beam extends.

2. The method of claim 1 wherein the optical beam has an asymmetric intensity distribution extending along the first axis.

3. The method of claim 1 further comprising spatially dispersing the optical beam into a plurality of wavelengths that are distributed along the first axis of the SLM.

4. The method of claim 3 further comprising recombining the plurality of wavelengths after being modulated by the SLM to form a recombined optical beam with the selected level of attenuation that can be varied according to wavelength.

5. The method of claim 3 where the periodicity of the selected pattern changes over distances larger than a beam diameter of each individual wavelength to thereby impart relatively uniform levels of attenuation that can be selectively changed for different wavelength ranges.

6. The method of claim 3 where the periodicity of the selected pattern changes over distances smaller than a beam diameter of each individual wavelength to thereby impart nominally continuous attenuation level changes for a particular wavelength range.

7. The method of claim 6 where the continuous attenuation level changes within a particular wavelength range of a high bandwidth signal are selected to improve signal integrity of at least one high bandwidth signal within the particular wavelength range.

8. The method of claim 7 where the selected attenuation level changes within the particular wavelength range of a high bandwidth signal yields an attenuation change as a function of wavelength across a highest intensity of the signal that is approximately linear.

9. The method of claim 7 where the selected attenuation level changes within the particular wavelength range of a high bandwidth signal yields an attenuation change as a function of wavelength across a highest intensity bandwidth of the signal that is approximately quadratic.

10. The method of claim 7 where the selected attenuation level changes within the particular wavelength of a high bandwidth signal to yield an attenuation change across the highest intensity portion of the signal that complements a previous wavelength-dependent attenuation arising in the transmission path to cause an overall wavelength-independent net attenuation of a highest intensity portion of the signal.

11. The method of claim 7 where the selected attenuation level changes within the particular wavelength range of a high bandwidth signal yield an attenuation change as a function of wavelength that reduces the bandwidth of the highest intensity portion of the signal.

12. The method of claim 3 where the pattern includes a plurality of periodic attenuation patterns arranged to minimize intensity perturbations at a transition between patterns for different attenuation levels.

13. The method of claim 12 where the periodic attenuation patterns are selected to have an average attenuation level over each column of the pattern that closely approximates the average attenuation of the entire periodic pattern.

14. The method of claim 12 where the periodic attenuation patterns are selected to minimize a probability that an incomplete period will be required for an edge of the pattern at a transition boundary.

15. The method of claim 12 where the periodic attenuation patterns are selected to ensure that partial periodic patterns have an average attenuation level that closely approximates an average attenuation of the entire periodic pattern.

16. The method of claim 1 wherein the periodicity of the selected pattern is less than a diameter of the optical beam.

17. The method of claim 1 wherein the periodicity of the selected pattern is less than about ¼ of a diameter of the optical beam.

18. The method of claim 17 wherein the periodicity of the selected pattern along the first axis is less than about 1/10th of the diameter of the optical beam.

19. The method of claim 1 wherein the pattern has regions that impart substantially the same level of attenuation to portions of the optical beam on either side of any local intensity maximum therein.

20. The method of claim 1 wherein the pattern has regions that impart substantially the same level of attenuation to portions of the optical beam where there is a maximum rate of change in intensity on either side of a local intensity maximum.

21. An optical device, comprising:
an input port for receiving an optical beam; and
an SLM having a surface for receiving the optical beam, wherein the surface includes an array of pixels such that the optical beam is incident upon a plurality of the pixels, each of the pixels being in one of a multiple of discrete states that provide different amounts of modulation to optical energy incident thereon, the pixels being arranged in a pattern of the states that attenuate the optical beam by a desired amount, wherein the pattern is periodic along a first axis and symmetric along a second axis along which an intensity distribution of the optical beam extends.

22. The optical device of claim 21 further comprising a dispersive optical element for spatially dispersing the optical beam into a plurality of wavelengths, wherein the surface of the SLM receives the spatially dispersed wavelengths such that they extend along the first axis.

23. The optical device of claim 22 wherein the periodicity of the selected pattern changes over distances larger than a beam diameter of each individual wavelength to thereby impart relatively uniform levels of attenuation that can be selectively changed for different wavelength ranges.

24. The optical device of claim 22 wherein the periodicity of the selected pattern changes over distances smaller than a beam diameter of each individual wavelength to thereby impart nominally continuous attenuation level changes for a particular wavelength range.

25. The optical device of claim 24 wherein the continuous attenuation level changes within a particular wavelength range of a high bandwidth signal are selected to improve signal integrity of at least one high bandwidth signal within the particular wavelength range.

26. The optical device of claim 25 wherein the selected attenuation level changes within the particular wavelength range of a high bandwidth signal yields an attenuation change as a function of wavelength across a highest intensity of the signal that is approximately linear.

27. The optical device of claim 25 wherein the selected attenuation level changes within the particular wavelength range of a high bandwidth signal yields an attenuation change as a function of wavelength across a highest intensity bandwidth of the signal that is approximately quadratic.

28. The optical device of claim 25 wherein the selected attenuation level changes within the particular wavelength of a high bandwidth signal to yield an attenuation change across the highest intensity portion of the signal that complements a previous wavelength-dependent attenuation arising in the transmission path to cause an overall wavelength-independent net attenuation of a highest intensity portion of the signal.

29. The optical device of claim 25 wherein the selected attenuation level changes within the particular wavelength range of a high bandwidth signal yield an attenuation change as a function of wavelength that reduces the bandwidth of the highest intensity portion of the signal.

30. The optical device of claim 22 wherein the pattern includes a plurality of periodic attenuation patterns arranged to minimize intensity perturbations at a transition between patterns for different attenuation levels.

31. The optical device of claim 30 wherein the periodic attenuation patterns are selected to have an average attenuation level over each column of the pattern that closely approximates the average attenuation of the entire periodic pattern.

32. The optical device of claim 30 wherein the periodic attenuation patterns are selected to minimize a probability that an incomplete period will be required for an edge of the pattern at a transition boundary.

33. The optical device of claim 30 wherein the periodic attenuation patterns are selected to ensure that partial periodic patterns have an average attenuation level that closely approximates an average attenuation of the entire periodic pattern.

34. The optical device of claim 21 wherein the SLM is a digital micromirror device (DMD).

35. The optical device of claim 21 further comprising a second dispersive optical element for recombining the plurality of wavelengths after being modulated by the SLM to form a recombined optical beam with the desired amount of attenuation that can be varied according to wavelength.

36. The optical device of claim 21 wherein the periodicity of the selected pattern along the first axis is less than a diameter of the optical beam.

37. The optical device of claim 21 wherein the periodicity of the selected pattern along the first axis is less than about ¼ of a diameter of the optical beam.

38. The optical device of claim 37 wherein the periodicity of the selected pattern along the first axis is less than about 1/10th of the diameter of the optical beam.

39. The optical device of claim 21 wherein the pattern has regions that impart substantially the same level of attenuation to portions of the optical beam on either side of any local intensity maximum therein.

40. The optical device of claim 21 wherein the pattern has regions that impart substantially the same level of attenuation to portions of the optical beam on either side of its local intensity maximum where there is a maximum rate of change in intensity.

41. A computer-readable storage medium containing instructions which, when performed by one or more processors disposed in an electronic device, performs a method comprising:
receiving an input signal representing a desired level of attenuation to be applied to an optical beam; and
causing an array of pixels in a SLM to be arranged into a pattern of states such that the SLM will attenuate the optical beam by the desired amount, wherein the pattern is symmetric along a second axis and periodic along a first axis.

42. The computer-readable medium of claim 41 wherein the states correspond to ON and OFF pixel states, respectively.

43. The computer-readable medium of claim 42 wherein the periodicity of the selected pattern is less than a diameter of the optical beam.

44. The computer-readable medium of claim 42 wherein the periodicity of the selected pattern is less than about ¼ of a diameter of the optical beam.

45. The computer-readable medium of claim 42 wherein the periodicity of the selected pattern is less than about 1/10th of the diameter of the optical beam.

46. The computer-readable medium of claim 42 wherein the periodic attenuation patterns are selected to ensure that partial periodic patterns have an average attenuation level that closely approximates an average attenuation of the entire periodic pattern.

47. The computer-readable medium of claim 41 wherein the optical beam comprises a plurality of wavelengths that are spatially dispersed along the first axis.

48. The computer-readable medium of claim 41 wherein the pattern has regions that impart substantially the same level of attenuation to portions of the optical beam on either side of any local intensity maximum therein.

49. The computer-readable medium of claim 41 wherein the pattern has regions that impart substantially the same level of attenuation to portions of the optical beam on either side of its local intensity maximum where there is a maximum rate of change in intensity.

50. The computer-readable medium of claim 41 wherein the periodicity of the selected pattern is changed over distances larger than a beam diameter of each individual wavelength to thereby impart relatively uniform levels of attenuation that can be selectively changed for different wavelengths.

51. The computer-readable medium of claim 41 wherein the periodicity of the selected pattern is changed over distances smaller than a beam diameter of each individual wavelength to thereby impart nominally continuous attenuation level changes for a series of wavelengths.

52. The computer-readable medium of claim 41 wherein the pattern includes periodic attenuation patterns that are arranged to minimize intensity perturbations at a transition between patterns for different attenuation levels.

53. The computer-readable medium of claim 41 wherein the periodic attenuation patterns are selected to have an average attenuation level over each column of the pattern that closely approximates the average attenuation of the entire periodic pattern.

54. The computer-readable medium of claim 41 wherein the periodic attenuation patterns are selected to minimize aprobability that an incomplete period will be required for an edge of the pattern at a transition boundary.

55. An optical communication system, comprising:
an input port for receiving an information-bearing optical beam; and
an output port for transmitting the optical beam;
a processor for utilizing the information carried within the information bearing optical beam; and
at least one SLM having a surface for receiving the optical beam, wherein the surface includes an array of pixels such that the optical beam is incident upon a plurality of the pixels, each of the pixels being in one of a multiple of discrete states that provide different amounts of modulation to optical energy incident thereon, the pixels being arranged in a pattern of the states that attenuate the optical beam by a desired amount, wherein the pattern is periodic along a first axis and symmetric about a second axis along which an intensity distribution of the optical beam extends.

56. The optical communication system of claim 55, where the periodicity of the selected pattern changes over distances larger than a beam diameter of each individual wavelength to thereby impart relatively uniform levels of attenuation that can be selectively changed for different wavelength ranges.

57. The optical communication system of claim 55, where the periodicity of the selected pattern changes over distances smaller than a beam diameter of each individual wavelength to thereby impart nominally continuous attenuation level changes for a particular wavelength range.

58. The optical communication system of claim 57, wherein the continuous attenuation level changes within a particular wavelength range of a high bandwidth signal are selected to improve the signal integrity of at least one high bandwidth signal within the particular wavelength range.

59. The optical communication system of claim 58, where the selected attenuation level changes within the particular wavelength range of a high bandwidth signal yields an attenuation change as a function of wavelength across a highest intensity of the signal that is approximately linear.

60. The optical communication system of claim 58, where the selected attenuation level changes within the particular wavelength range of a high bandwidth signal yields an attenuation change as a function of wavelength across a highest intensity of the signal that is approximately quadratic.

61. The optical communication system of claim 58, where the selected attenuation level changes within the particular wavelength range of a high bandwidth signal to yield an attenuation change the highest intensity portion of the signal that complements a previous wavelength-dependent attenuation arising in the transmission path to cause an overall wavelength-independent net attenuation of a highest intensity portion of the signal.

62. The optical communication system of claim 58, where the selected attenuation level changes within the particular wavelength range of a high bandwidth signal yield an attenuation change as a function of wavelength that reduces the bandwidth of the highest intensity portion of the signal.

* * * * *